United States Patent
Belloni

(10) Patent No.: US 9,374,000 B1
(45) Date of Patent: Jun. 21, 2016

(54) CONTROLLING DC-TO-DC CONVERTER DUTY CYCLE BY SHIFTING PWM RAMP

(71) Applicant: Maxim Integrated Products, Inc., San Jose, CA (US)

(72) Inventor: Massimiliano Belloni, Pavia (IT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/276,181

(22) Filed: May 13, 2014

Related U.S. Application Data

(60) Provisional application No. 61/936,447, filed on Feb. 6, 2014.

(51) Int. Cl.
*G05F 5/00* (2006.01)
*H02M 3/04* (2006.01)

(52) U.S. Cl.
CPC .................................. *H02M 3/04* (2013.01)

(58) Field of Classification Search
USPC ................. 323/222, 271, 282–285, 288, 299
See application file for complete search history.

(56) References Cited

U.S. PATENT DOCUMENTS

| | | | | |
|---|---|---|---|---|
| 2009/0128113 A1* | 5/2009 | Ryoo | ...................... | G05F 1/618 323/283 |
| 2010/0253309 A1* | 10/2010 | Xi | ......................... | H02M 3/156 323/288 |
| 2010/0289471 A1* | 11/2010 | Kasai et al. | ................... | 323/282 |
| 2012/0169306 A1* | 7/2012 | Wu | ............................... | 323/271 |
| 2013/0257399 A1* | 10/2013 | Jiang et al. | .................... | 323/271 |

OTHER PUBLICATIONS

Huang, Cheng and Philip K.T. Mok. "Cross-Regulation-Suppression Control Scheme for CCM Single-Inductor-Dual-Output Buck Converter with Ordered-Power-Distributive Control." IEEE International Symposium on Circuits and Systems (ISCAS). Rio de Janeiro, Brazil, May 15-18, 2011. pp. 1612-1615.

\* cited by examiner

*Primary Examiner* — Nguyen Tran

(57) ABSTRACT

A system includes a pulse width modulator and a shift generator. The pulse width modulator receives a saw-tooth signal and generates pulse width modulated pulses based on the saw-tooth signal to regulate an output voltage of a DC-to-DC converter. The shift generator generates a DC voltage in response to a change in an input voltage of the DC-to-DC converter and shifts the saw-tooth signal by the DC voltage to regulate the output voltage of the DC-to-DC converter.

19 Claims, 7 Drawing Sheets

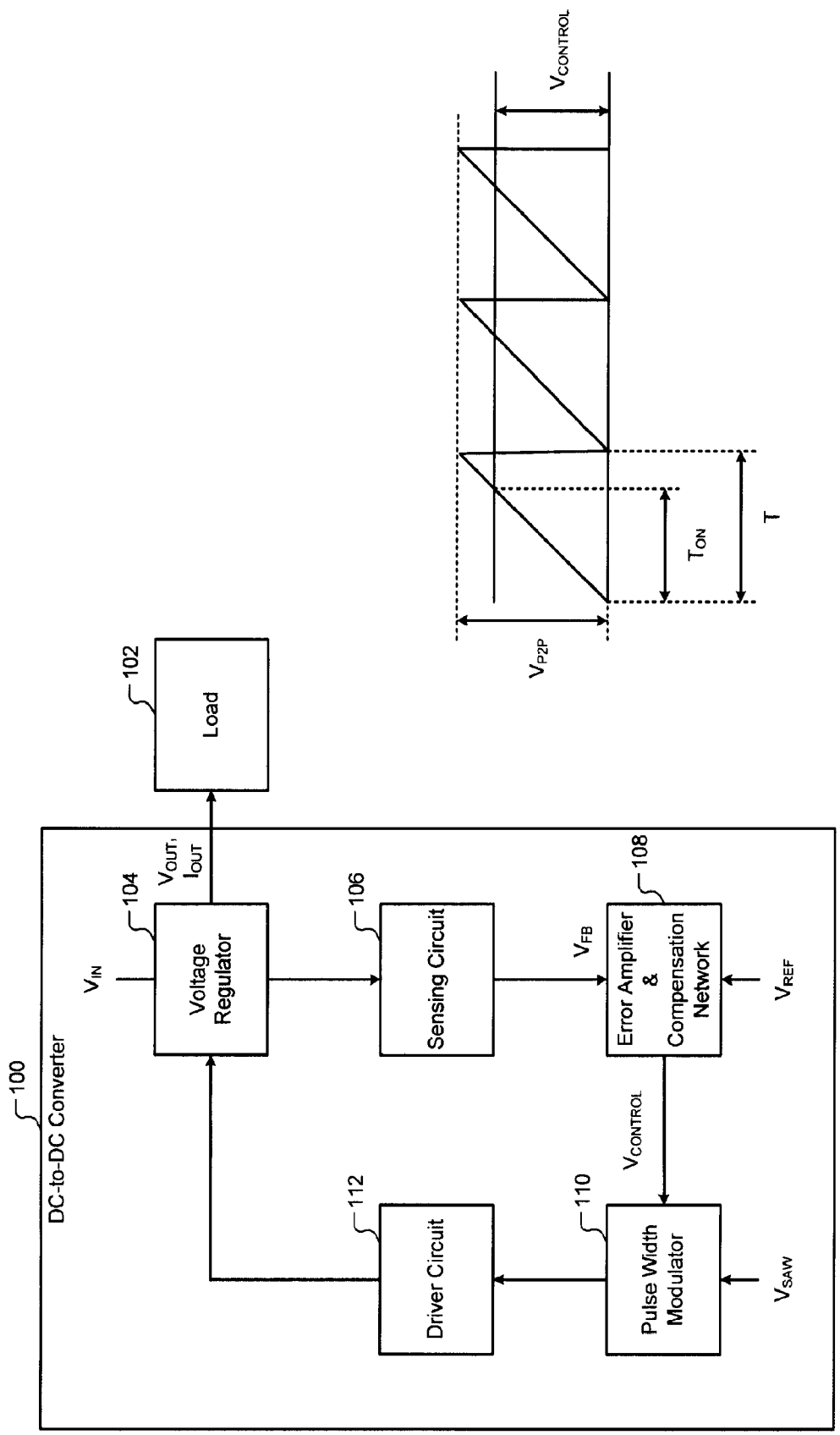

CONTROLLING DC-TO-DC CONVERTER DUTY CYCLE BY SHIFTING PWM RAMP

CROSS-REFERENCE TO RELATED APPLICATIONS

This application claims the benefit of U.S. Provisional Application No. 61/936,447, filed on Feb. 6, 2014. The entire disclosure of the application referenced above is incorporated herein by reference.

FIELD

The present disclosure relates generally to power supplies and more particularly to controlling duty cycle of DC-to-DC converters by shifting pulse width modulator ramp.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

DC-to-DC converters that utilize pulse width modulation (PWM) for output regulation are used in power supplies in many applications. For example, the DC-to-DC converters are used in power supplies that supply a regulated output current to LED-based lighting applications. Use of LED-based lighting applications is proliferating in homes, automobiles, and in business environments.

SUMMARY

A system comprises a pulse width modulator and a shift generator. The pulse width modulator receives a saw-tooth signal and generates pulse width modulated pulses based on the saw-tooth signal to regulate an output voltage of a DC-to-DC converter. The shift generator generates a DC voltage in response to a change in an input voltage of the DC-to-DC converter and shifts the saw-tooth signal by the DC voltage to regulate the output voltage of the DC-to-DC converter.

In another feature, the shift generator generates the DC voltage based on a ratio of the output voltage of the DC-to-DC converter to the input voltage of the DC-to-DC converter.

In another feature, the shift generator generates the DC voltage based on a product of a peak-to-peak value of the saw-tooth signal and a ratio of the output voltage of the DC-to-DC converter to the input voltage of the DC-to-DC converter.

In another feature, the pulse width modulator changes a duty cycle of the pulse width modulated pulses in response to the saw-tooth signal being shifted by the DC voltage.

In other features, the system further comprises an error amplifier that receives a feedback signal from an output of the DC-to-DC converter, that compares the feedback signal to a reference voltage, and that generates a control signal based on the comparison of the feedback signal to the reference voltage. The shift generator generates the DC voltage based on the control signal, a peak-to-peak value of the saw-tooth signal, and a ratio of the output voltage of the DC-to-DC converter to the input voltage of the DC-to-DC converter.

In another feature, the pulse width modulator compares the control signal to the saw-tooth signal and generates the pulse width modulated pulses based on the comparison of the control signal to the saw-tooth signal.

In another feature, the control signal remains unchanged in response to the change in the input voltage of the DC-to-DC converter.

In still other features, a system comprises a sensing circuit, an error amplifier, a pulse width modulator, and a shift generator. The sensing circuit senses an output of a DC-to-DC converter. The error amplifier receives the sensed output of the DC-to-DC converter, compares the sensed output of the DC-to-DC converter to a reference voltage, and generates a control signal based on the comparison of the sensed output of the DC-to-DC converter to the reference voltage. The pulse width modulator receives a saw-tooth signal, compares the control signal to the saw-tooth signal, and generates pulse width modulated pulses based on the comparison of the control signal to the saw-tooth signal. The shift generator generates a DC voltage in response to a change in an input voltage of the DC-to-DC converter and shifts the saw-tooth signal by the DC voltage to regulate an output voltage of the DC-to-DC converter.

In another feature, the pulse width modulator controls a duty cycle of the pulse width modulated pulses based on the saw-tooth signal shifted by the DC voltage.

In another feature, the control signal remains unchanged in response to the change in the input voltage of the DC-to-DC converter.

In another feature, the DC voltage is proportional to a ratio of the output voltage of the DC-to-DC converter to the input voltage of the DC-to-DC converter.

In another feature, the shift generator generates the DC voltage based on a peak-to-peak value of the saw-tooth signal and a ratio of the output voltage of the DC-to-DC converter to the input voltage of the DC-to-DC converter.

In still other features, a method comprises generating pulse width modulated pulses based on a saw-tooth signal to regulate an output voltage of a DC-to-DC converter, generating a DC voltage in response to a change in an input voltage of the DC-to-DC converter, and shifting the saw-tooth signal by the DC voltage to regulate the output voltage of the DC-to-DC converter.

In another feature, the method further comprises generating the DC voltage based on a ratio of the output voltage of the DC-to-DC converter to the input voltage of the DC-to-DC converter.

In another feature, the method further comprises generating the DC voltage based on a product of a peak-to-peak value of the saw-tooth signal and a ratio of the output voltage of the DC-to-DC converter to the input voltage of the DC-to-DC converter.

In another feature, the method further comprises changing a duty cycle of the pulse width modulated pulses in response to the saw-tooth signal being shifted by the DC voltage.

In other features, the method further comprises generating a feedback signal from an output of the DC-to-DC converter, comparing the feedback signal to a reference voltage, and generating a control signal based on the comparison of the feedback signal to the reference voltage. The method further comprises generating the DC voltage based on the control signal, a peak-to-peak value of the saw-tooth signal, and a ratio of the output voltage of the DC-to-DC converter to the input voltage of the DC-to-DC converter.

In other features, the method further comprises comparing the control signal to the saw-tooth signal, and generating the pulse width modulated pulses based on the comparison of the control signal to the saw-tooth signal.

In another feature, the method further comprises keeping the control signal unchanged in response to the change in the input voltage of the DC-to-DC converter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a functional block diagram of a DC-to-DC converter;

FIG. 1C shows a sawtooth voltage used by a pulse width modulator to regulate an output of the DC-to-DC converter shown in FIG. 1A;

In the drawings, reference numbers may be reused to identify similar and/or identical elements.

DETAILED DESCRIPTION

In some DC-to-DC converters that use pulse width modulation (PWM) based regulation, an input voltage can change over a wide range (e.g., 4.5V-60V). The input voltage may also include transients with fast rise and fall times (i.e., steep rising and falling edges) (e.g., 1-2 µs). These DC-to-DC converters may exhibit line transient response issues. For example, the line transient response issues may include output voltage overshoot/undershoot, output current overshoot/undershoot, slow response times, and high slew-rate current requirement for transconductance (GM) stages.

The present disclosure relates to systems and methods that improve the line transient response of the DC-to-DC converters by shifting a ramp voltage of a PWM-based regulator depending on input and output voltage values. The teachings of the present disclosure can be applied to average-current-mode DC-to-DC converters and can be extended to voltage-mode DC-to-DC converters.

Figure 1B:
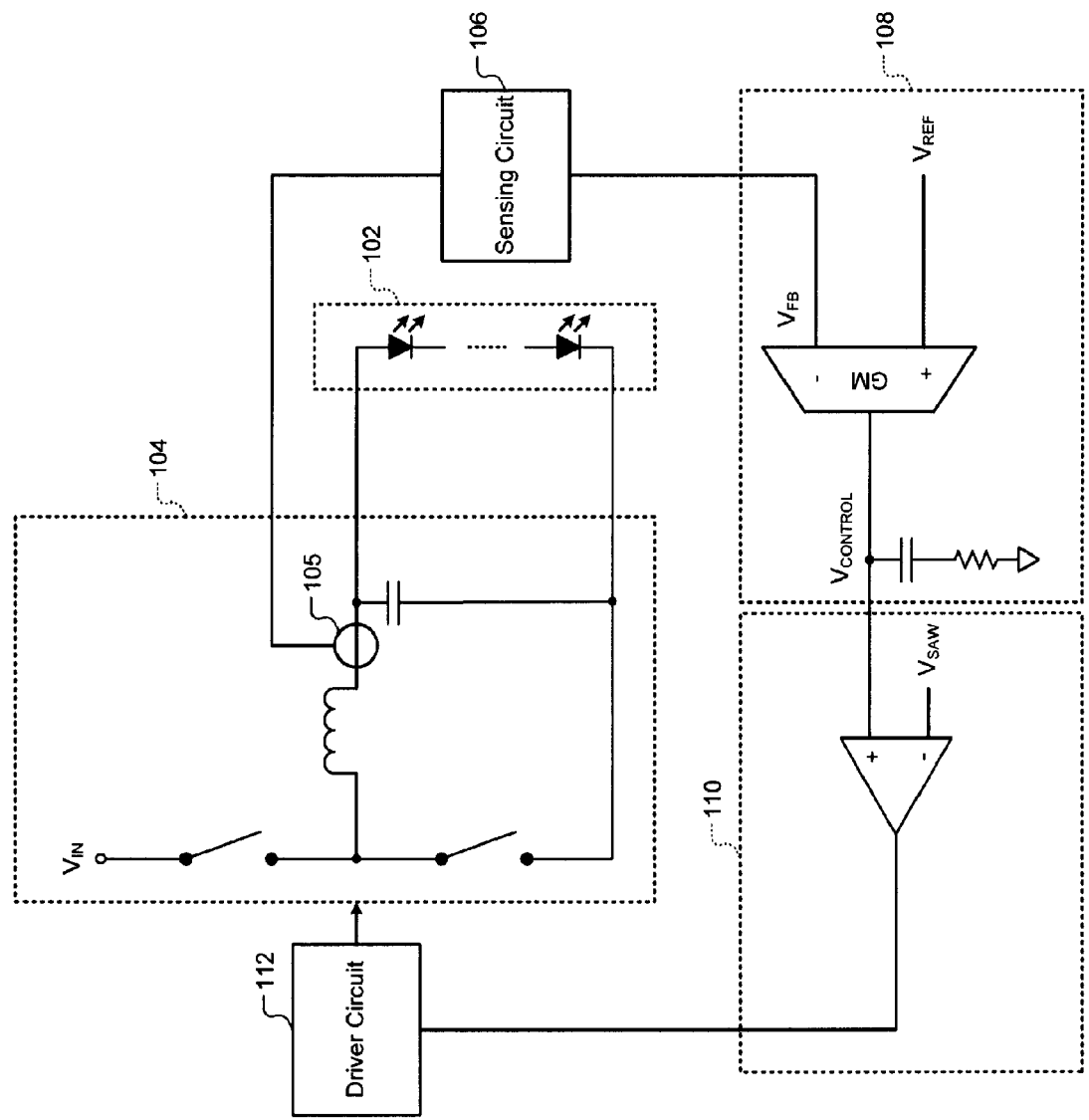
FIG. 1B is an example of the DC-to-DC converter shown in FIG. 1A based on an average current mode control topology.

Referring now to FIGS. 1A-1B, a DC-to-DC converter 100 is shown. In FIG. 1A, the DC-to-DC converter 100 receives an input voltage $V_{IN}$ and supplies an output voltage $V_{OUT}$ and an output current $I_{OUT}$ to a load 102. The DC-to-DC converter 100 includes a voltage regulator 104, a sensing circuit 106, an error amplifier 108, a pulse width modulator 110, and a driver circuit 112. In FIG. 1B, the voltage regulator 104 includes an inductor current sensing block 105. The error amplifier 108 includes an error amplifier and a compensation network.

The voltage regulator 104 receives the input voltage $V_{IN}$ and regulates the output voltage $V_{OUT}$. The sensing circuit 106 senses an output of the voltage regulator 104 (e.g., an inductor current) and generates a feedback voltage $V_{FB}$. The error amplifier 108 compares the feedback voltage $V_{FB}$ to a reference voltage $V_{REF}$ and generates a control voltage $V_{CONTROL}$.

The pulse width modulator 110 receives a sawtooth voltage $V_{SAW}$ and generates pulse width modulated pulses to control the voltage regulator 104. When the input voltage $V_{IN}$ varies, the error amplifier 108 changes the control voltage $V_{CONTROL}$. The pulse width modulator 110 compares the control voltage $V_{CONTROL}$ to the sawtooth voltage $V_{SAW}$ and changes a duty cycle of the pulse width modulated pulses. The driver circuit 112 drives the switches of the voltage regulator based on the pulse width modulated pulses.

In FIG. 1B, an example of the DC-to-DC converter 100 is shown. For example, the control scheme of the DC-to-DC converter 100 can be an average current mode. For example, the load 102 may include a plurality of LEDs connected in series as shown. For example, the voltage regulator 104 may include a Buck regulator including a plurality of switches, an inductance L, and a capacitance C connected as shown. Alternatively, the voltage regulator 104 may include a Boost regulator, a Buck-Boost regulator, or any other regulator. For example, the inductor current sensing block 105 senses the inductor current. For example, the error amplifier 108 may include a GM stage and an RC loop filter. The error amplifier 108 may generate the control voltage $V_{CONTROL}$ at a control node, which is the output of the error amplifier 108.

In FIG. 1C, an example of the sawtooth voltage $V_{SAW}$ is shown. The sawtooth voltage $V_{SAW}$ has a peak-to-peak value $V_{P2P}$ and a period T. An on-time $T_{ON}$ of the sawtooth voltage $V_{SAW}$ is controlled based on the control voltage $V_{CONTROL}$. A duty cycle of the pulse width modulated pulses generated based on the sawtooth voltage $V_{SAW}$ by the pulse width modulator 110 is given by $D=T_{ON}/T$. $V_{CONTROL}=V_{P2P}*(V_{OUT}/V_{IN})$.

Figure 2A:
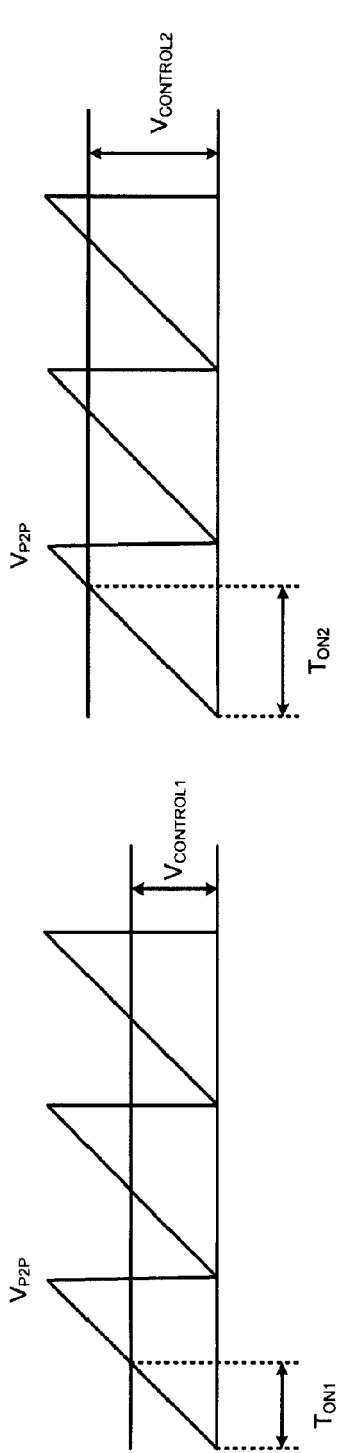
FIGS. 2A and 2B illustrate one way of changing a duty cycle of the DC-to-DC converter shown in FIG. 1A.
Figure 2B:
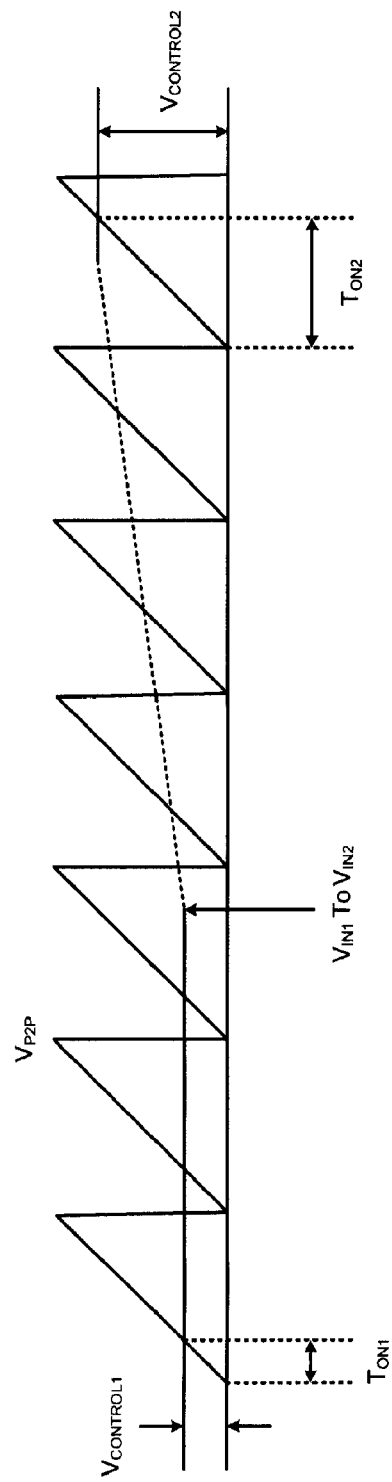

Referring now to FIGS. 2A and 2B, regulating the output of the DC-to-DC converter 100 using the control voltage $V_{CONTROL}$ is shown. If the input voltage $V_{IN}$ of the DC-to-DC converter 100 changes from $V_{IN1}$ to $V_{IN2}$, to maintain regulation, the error amplifier 108 changes the control voltage $V_{CONTROL}$ from $V_{CONTROL1}$ to $V_{CONTROL2}$, where $V_{CONTROL1}=V_{P2P}*(V_{OUT}/V_{IN1})=V_{P2P}*D1$, and $V_{CONTROL2}=V_{P2P}*(V_{OUT}/V_{IN2})=V_{P2P}*D2$. Changing the control voltage $V_{CONTROL}$ from $V_{CONTROL1}$ to $V_{CONTROL2}$ changes the on-time $T_{ON}$ of the sawtooth voltage $V_{SAW}$ from $T_{ON1}$ to $T_{ON2}$ as shown, and regulation is maintained by changing the duty cycle from D1 to D2. The change in the control voltage, $\Delta V_{CONTROL}$, is related to the change in duty cycle (D2−D1) according to the equation $\Delta V_{CONTROL}=V_{CONTROL2}-V_{CONTROL1}=V_{P2P}*(D2-D1)$.

Figure 3:
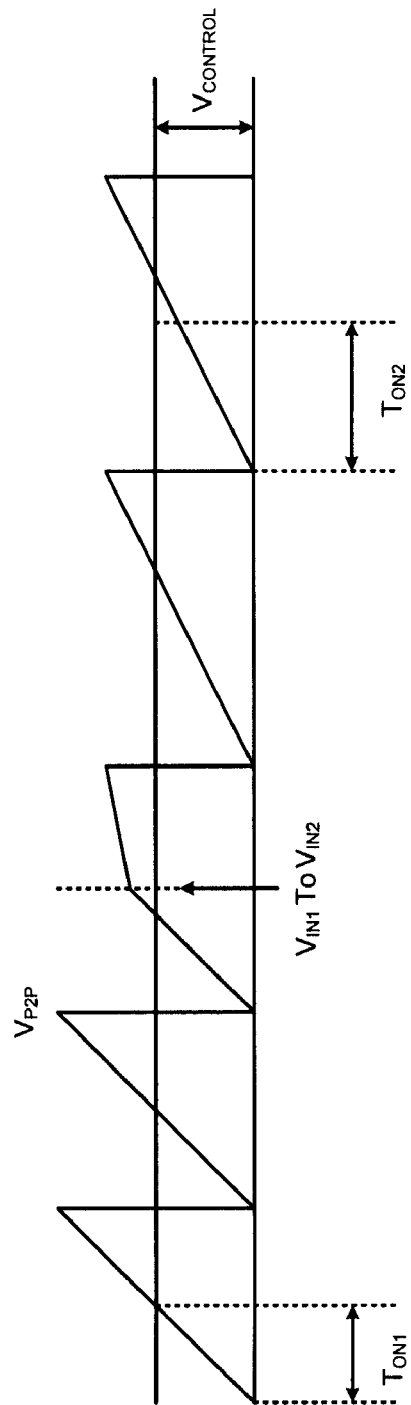
FIG. 3 illustrates another way of changing a duty cycle of the DC-to-DC converter shown in FIG. 1A.

Referring now to FIG. 3, regulation can also be maintained by changing the peak-to-peak voltage $V_{P2P}$ of the sawtooth voltage $V_{SAW}$ instead of changing the control voltage $V_{CONTROL}$. The peak-to-peak voltage $V_{P2P}$ of the sawtooth voltage $V_{SAW}$ can be changed according to changes in the input voltage $V_{IN}$ without changing the control voltage $V_{CONTROL}$ as shown.

In an average-current-mode DC-to-DC converter, an inductor current (e.g., sensed by the sensing circuit 106) is averaged. The averaged inductor current is dynamically adjusted by a compensation network (e.g., element 108). The adjusted inductor current is compared to a ramp voltage (e.g., the sawtooth voltage $V_{SAW}$) that is input to a pulse width modulator (e.g., the pulse width modulator 110). During a line transient, to achieve a new steady-state duty cycle for output regulation, an output voltage of the GM stage of the DC-to-DC converter (e.g., the control voltage $V_{CONTROL}$) needs to change (as in a voltage-mode DC-to-DC converter), which requires the GM stage to charge/discharge a capacitor with high slew-rate currents.

The overshoot/undershoot in a regulated output voltage and/or current and the response time of the DC-to-DC converter depend on characteristics of the loop filter used in the DC-to-DC converter. The overshoot/undershoot and the response time for large-signal transients are limited by the slew current of the GM stage. This can be important for low-transconductance GM stages responding to steep input voltage edges (1-2 μs). The transient response of the DC-to-DC converter can be improved by adjusting the slope of the PWM ramp voltage proportionally to the input voltage. Adjusting the slope of the PWM ramp voltage, however, can lead to stability problems (since it also varies the loop gain and the cut-off frequency of the loop filter) and noise immunity issues (for small $V_{P2P}$ voltage values).

Instead, the steady-state duty cycle to maintain regulation can be provided by shifting the PWM ramp voltage. The PWM ramp voltage can be shifted based on a ratio of the output voltage to the input voltage of the DC-to-DC converter in a feed-forward path of the DC-to-DC converter. Shifting the PWM ramp voltage changes the duty cycle of the PWM pulses that regulate the output of DC-to-DC converter. An approximate (first order) value of the control voltage that is otherwise used to adjust the duty cycle in response to varying input voltage remains constant. The response time is determined by the feed-forward path while low regulation error is ensured by the GM stage loop filter path that needs to adjust the control voltage only slightly. Large signal transitions on the control node are avoided, and large GM stage slew currents are not needed. The shift in the PWM ramp voltage can be generated by an analog multiplier that senses the input and output voltages of the DC-to-DC converter. The multiplier gain can be based on the peak-to-peak voltage of the PWM ramp. The error amplifier 108 corrects any residual multiplier circuit error that may occur due to its non-idealities.

Figure 4A:
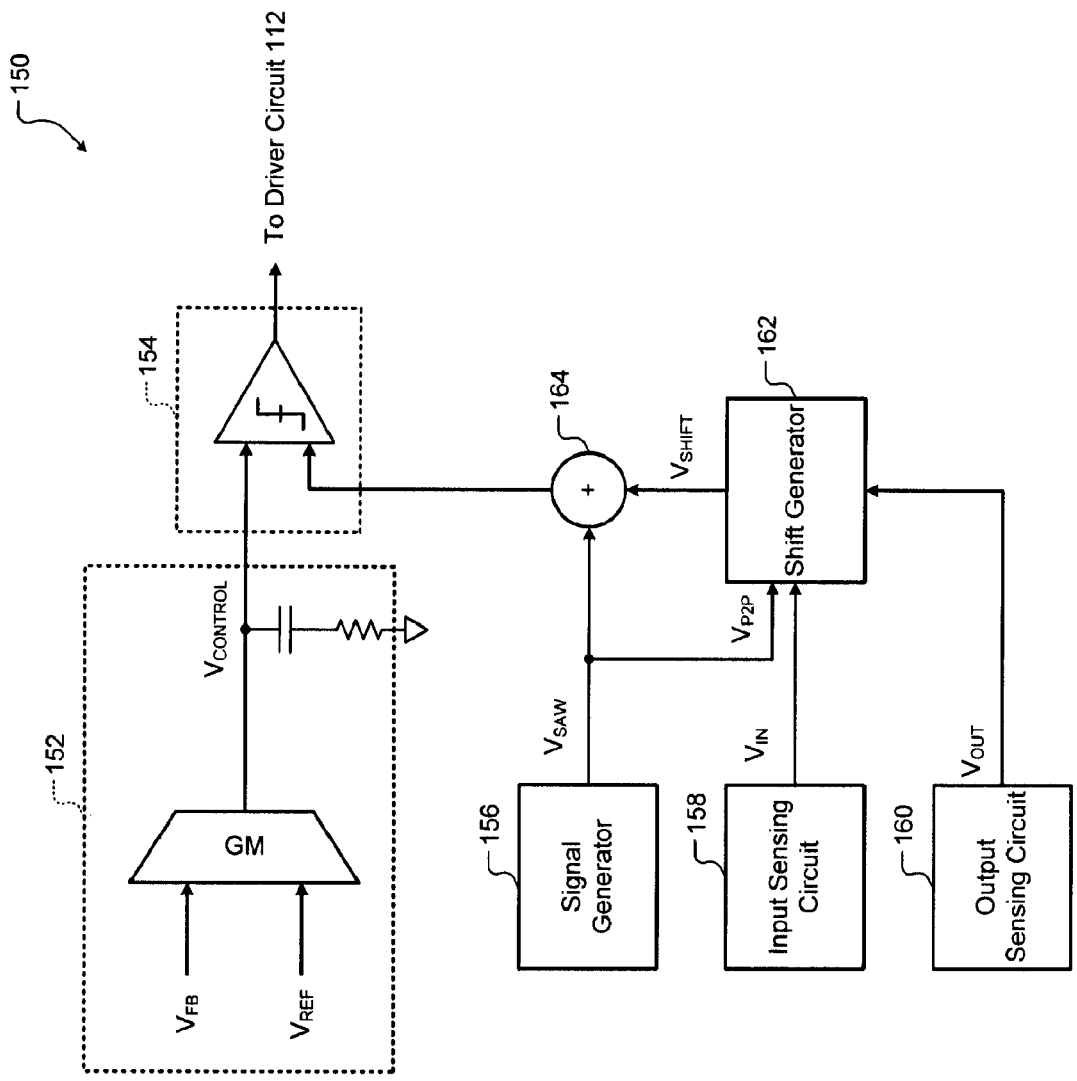
FIG. 4A is a functional block diagram of a DC-to-DC converter control circuit that includes a shift generator to shift a sawtooth voltage used by a pulse width modulator to regulate an output of the DC-to-DC converter.
Figure 4B:
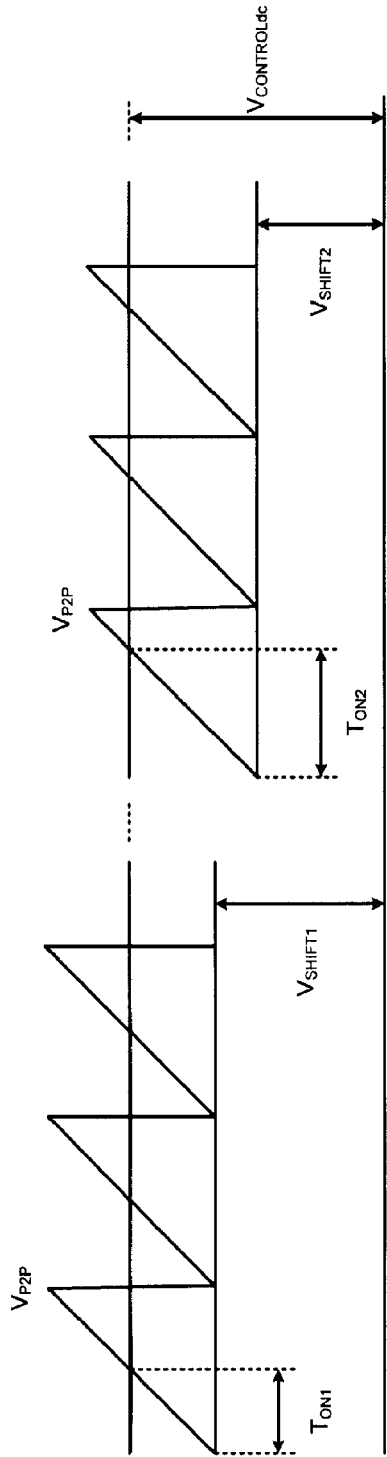
FIGS. 4B and 4C illustrate shifting of the sawtooth voltage in response to a change in an input voltage to regulate the output of the DC-to-DC converter shown in FIG. 4A.
Figure 4C:
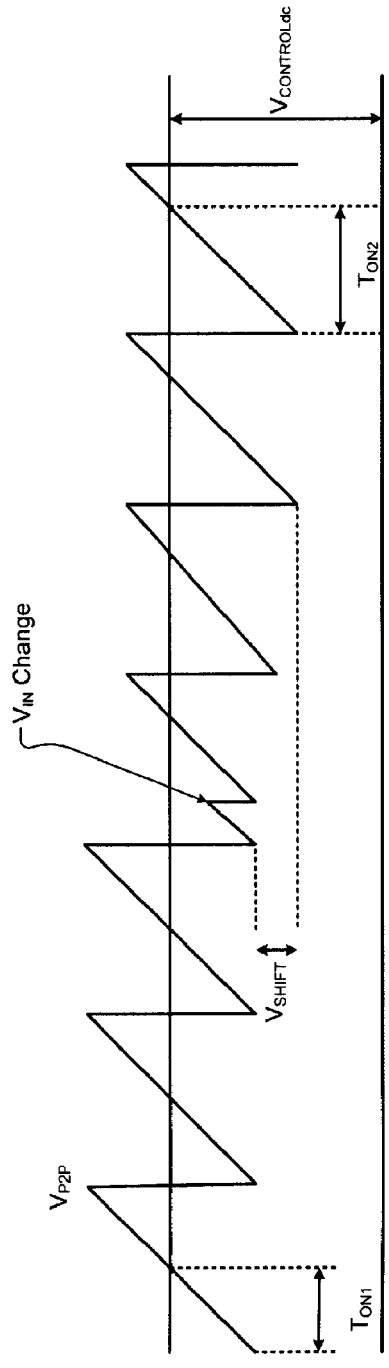

Referring now to FIGS. 4A-4C, a system 150 that shifts the PWM ramp voltage to maintain regulation in a DC-to-DC converter using feed-forward control is shown. In FIG. 4A, the system 150 includes an error amplifier 152, a pulse width modulator 154, a signal generator 156, an input sensing circuit 158, an output sensing circuit 160, a shift generator 162, and an adder 164. The error amplifier 152 includes an error amplifier and a compensation network.

The error amplifier 152 generates the control voltage $V_{CONTROL}$ based on the feedback voltage $V_{FB}$ (e.g., received from the sensing circuit 106 shown in FIGS. 1A and 1B) and the reference voltage $V_{REF}$. The signal generator 156 generates the sawtooth voltage $V_{SAW}$. The sawtooth voltage $V_{SAW}$ has a peak-to-peak value $V_{P2P}$ and a period T. The input sensing circuit 158 senses the input voltage $V_{IN}$ of the DC-to-DC converter. The output sensing circuit 160 senses the output voltage $V_{OUT}$ of the DC-to-DC converter. The shift generator 162 generates a DC voltage $V_{SHIFT}$ based on the input voltage $V_{IN}$, the output voltage $V_{OUT}$, and the peak-to-peak value $V_{P2P}$ of the sawtooth voltage $V_{SAW}$.

The adder 164 adds the DC voltage $V_{SHIFT}$ to the sawtooth voltage $V_{SAW}$, which shifts the sawtooth voltage $V_{SAW}$ by the DC voltage $V_{SHIFT}$. Shifting the sawtooth voltage $V_{SAW}$ by the DC voltage $V_{SHIFT}$ changes the duty cycle of the DC-to-DC converter. The pulse width modulator 154 generates pulse width modulated pulses based on the output of the adder 164. The pulse width modulated pulses generated by the pulse width modulator 154 are input to the driver circuit 112 to regulate the output of the DC-to-DC converter.

In FIG. 4B, when the input voltage $V_{IN}$ of the DC-to-DC converter is $V_{IN1}$, the value of the DC voltage $V_{SHIFT}$ generated by the shift generator 162 is $V_{SHIFT1}$, and the on-time of the sawtooth voltage $V_{SAW}$ is $T_{ON1}$. $V_{SHIFT1}=V_{CONTROLdc}-V_{P2P}*(V_{OUT}/V_{IN1})$. When the input voltage $V_{IN}$ of the DC-to-DC converter changes from $V_{IN1}$ to $V_{IN2}$, the value of the DC voltage $V_{SHIFT}$ generated by the shift generator 162 is $V_{SHIFT2}$, and the on-time of the sawtooth voltage $V_{SAW}$ is $T_{ON2}$. $V_{SHIFT2}=V_{CONTROLdc}-V_{P2P}*(V_{OUT}/V_{IN2})$. An approximate (first order) value of the control voltage $V_{CONTROL}$ remains unchanged and is equal to $V_{CONTROLdc}$.

In FIG. 4C, a shift $V_{SHIFT}$ in the PWM ramp (i.e., the sawtooth voltage $V_{SAW}$) can be achieved in a few cycles (e.g., 1-2 cycles) of the sawtooth voltage $V_{SAW}$. In general, the shift generator 162 shifts the PWM ramp by $V_{SHIFT}=V_{CONTROLdc}-V_{P2P}*(V_{OUT}/V_{IN})$. Accordingly, the shift generator 162 generates the DC voltage shift $V_{SHIFT}$ based on the approximate (first order) desired value of the control voltage $V_{CONTROLdc}$, the peak-to-peak value $V_{P2P}$ of the sawtooth voltage $V_{SAW}$, and the ratio of the output voltage to the input voltage $V_{OUT}/V_{IN}$.

Figure 5:
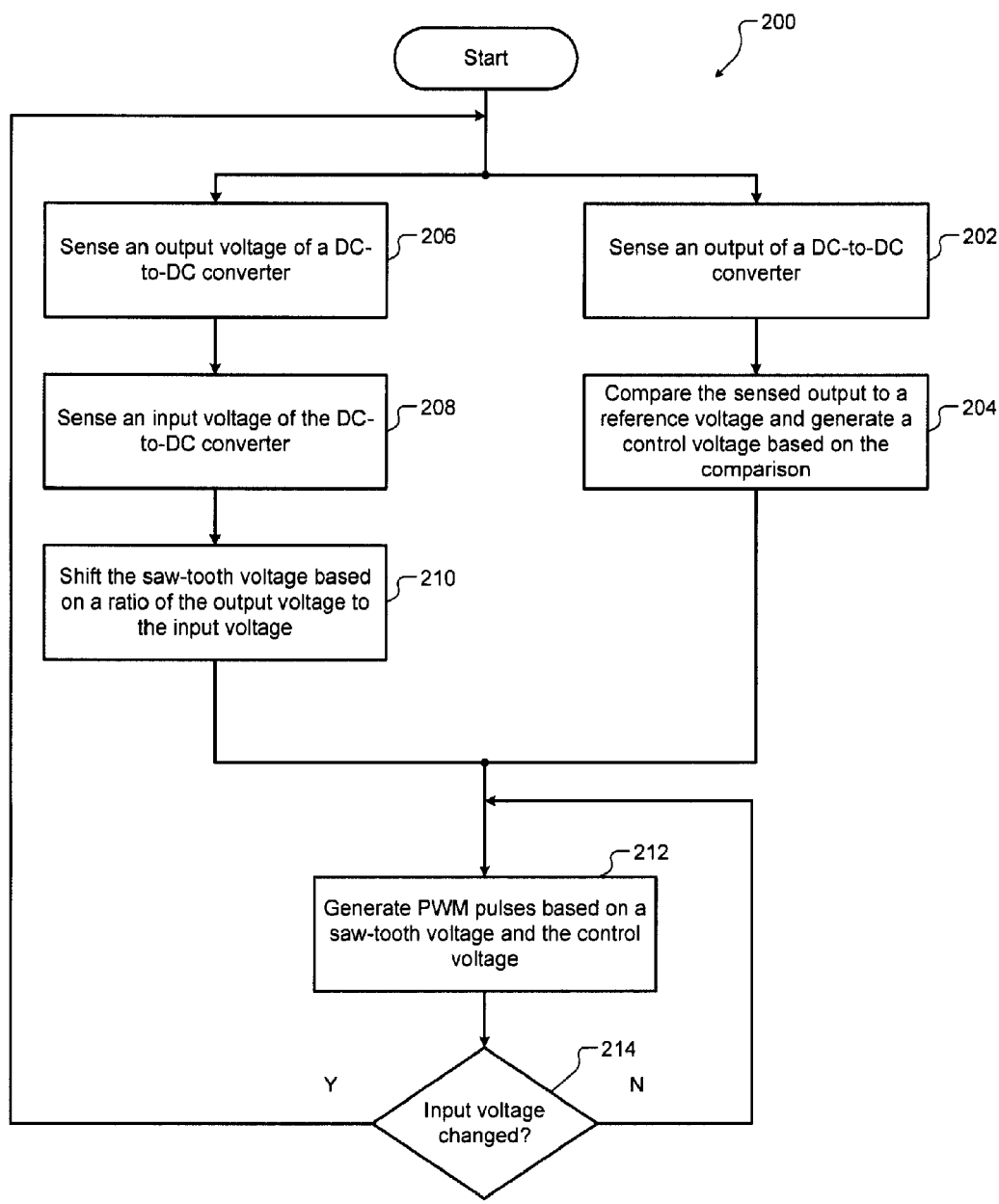
FIG. 5 is a flowchart of a method for shifting a sawtooth voltage used by a pulse width modulator of a DC-to-DC converter in response to a change in an input voltage to regulate an output of the DC-to-DC converter.

Referring now to FIG. 5, a method 200 for shifting a PWM ramp voltage of a DC-to-DC converter to maintain regulation is shown. At 202, an output of the DC-to-DC converter is sensed. At 204, the sensed output is compared to a reference voltage, and a control voltage is generated based on the comparison. At 206, an output voltage of the DC-to-DC converter is sensed. At 208, an input voltage of the DC-to-DC converter is sensed. At 210, a sawtooth voltage input to a pulse-width modulator of the DC-to-DC converter is shifted based on a ratio of the output voltage to the input voltage of the DC-to-DC converter. At 212, pulse width modulated pulses are generated based on the shifted sawtooth voltage and the control voltage. At 214, whether the input voltage of the DC-to-DC converter changed is determined, and the sawtooth voltage DCshift is recomputed at 210.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system comprising:
   a pulse width modulator that receives a saw-tooth signal and that generates pulse width modulated pulses based on the saw-tooth signal to regulate an output voltage of a DC-to-DC converter; and
   a shift generator that generates a DC voltage that is different than the saw-tooth signal based on the saw-tooth signal and a change in an input voltage of the DC-to-DC converter and that shifts a DC level of the saw-tooth signal by the DC voltage to regulate the output voltage of the DC-to-DC converter.

2. The system of claim 1 wherein the shift generator generates the DC voltage based on a ratio of the output voltage of the DC-to-DC converter to the input voltage of the DC-to-DC converter.

3. The system of claim 1 wherein the shift generator generates the DC voltage based on a product of a peak-to-peak value of the saw-tooth signal and a ratio of the output voltage of the DC-to-DC converter to the input voltage of the DC-to-DC converter.

4. The system of claim 1 wherein the pulse width modulator changes a duty cycle of the pulse width modulated pulses in response to the saw-tooth signal being shifted by the DC voltage.

5. The system of claim 1 further comprising:
an error amplifier that receives a feedback signal from an output of the DC-to-DC converter, that compares the feedback signal to a reference voltage, and that generates a control signal based on the comparison of the feedback signal to the reference voltage,
wherein the shift generator generates the DC voltage based on the control signal, a peak-to-peak value of the saw-tooth signal, and a ratio of the output voltage of the DC-to-DC converter to the input voltage of the DC-to-DC converter.

6. The system of claim 5 wherein the pulse width modulator compares the control signal to the saw-tooth signal and generates the pulse width modulated pulses based on the comparison of the control signal to the saw-tooth signal.

7. The system of claim 5 wherein the control signal remains unchanged in response to the change in the input voltage of the DC-to-DC converter.

8. A system comprising:
a sensing circuit that senses an output of a DC-to-DC converter;
an error amplifier that receives the sensed output of the DC-to-DC converter, that compares the sensed output of the DC-to-DC converter to a reference voltage, and that generates a control signal based on the comparison of the sensed output of the DC-to-DC converter to the reference voltage;
a pulse width modulator that receives a saw-tooth signal, that compares the control signal to the saw-tooth signal, and that generates pulse width modulated pulses based on the comparison of the control signal to the saw-tooth signal; and
a shift generator that generates a DC voltage that is different than the saw-tooth signal based on the saw-tooth signal and a change in an input voltage of the DC-to-DC converter and that shifts a DC level of the saw-tooth signal by the DC voltage to regulate an output voltage of the DC-to-DC converter.

9. The system of claim 8 wherein the pulse width modulator controls a duty cycle of the pulse width modulated pulses based on the saw-tooth signal shifted by the DC voltage.

10. The system of claim 8 wherein the control signal remains unchanged in response to the change in the input voltage of the DC-to-DC converter.

11. The system of claim 8 wherein the DC voltage is proportional to a ratio of the output voltage of the DC-to-DC converter to the input voltage of the DC-to-DC converter.

12. The system of claim 8 wherein the shift generator generates the DC voltage based on a peak-to-peak value of the saw-tooth signal and a ratio of the output voltage of the DC-to-DC converter to the input voltage of the DC-to-DC converter.

13. A method comprising:
generating pulse width modulated pulses based on a saw-tooth signal to regulate an output voltage of a DC-to-DC converter;
generating a DC voltage that is different than the saw-tooth signal based on the saw-tooth signal and a change in an input voltage of the DC-to-DC converter; and
shifting a DC level of the saw-tooth signal by the DC voltage to regulate the output voltage of the DC-to-DC converter.

14. The method of claim 13 further comprising generating the DC voltage based on a ratio of the output voltage of the DC-to-DC converter to the input voltage of the DC-to-DC converter.

15. The method of claim 13 further comprising generating the DC voltage based on a product of a peak-to-peak value of the saw-tooth signal and a ratio of the output voltage of the DC-to-DC converter to the input voltage of the DC-to-DC converter.

16. The method of claim 13 further comprising changing a duty cycle of the pulse width modulated pulses in response to the saw-tooth signal being shifted by the DC voltage.

17. The method of claim 13 further comprising:
generating a feedback signal from an output of the DC-to-DC converter;
comparing the feedback signal to a reference voltage;
generating a control signal based on the comparison of the feedback signal to the reference voltage; and
generating the DC voltage based on the control signal, a peak-to-peak value of the saw-tooth signal, and a ratio of the output voltage of the DC-to-DC converter to the input voltage of the DC-to-DC converter.

18. The method of claim 17 further comprising:
comparing the control signal to the saw-tooth signal; and
generating the pulse width modulated pulses based on the comparison of the control signal to the saw-tooth signal.

19. The method of claim 17 further comprising keeping the control signal unchanged in response to the change in the input voltage of the DC-to-DC converter.

* * * * *